W. S. SIMS.
Electro-Magnetic Motors.

No. 152,772.  Patented July 7, 1874.

Witnesses.
A. S. Fitch
Wm. G. Bussey

Inventor.
Winfield S. Sims
By J. P. Fitch his atty.

UNITED STATES PATENT OFFICE.

WINFIELD S. SIMS, OF NEW YORK, N. Y.

IMPROVEMENT IN ELECTRO-MAGNETIC MOTORS.

Specification forming part of Letters Patent No. 152,772, dated July 7, 1874; application filed March 17, 1873.

*To all whom it may concern:*

Be it known that I, WINFIELD S. SIMS, of the city, county, and State of New York, have invented an Improvement in Electro-Magnetic Motors, of which the following is a specification, reference being had to the accompanying drawings forming part thereof, in which—

Figure 1:
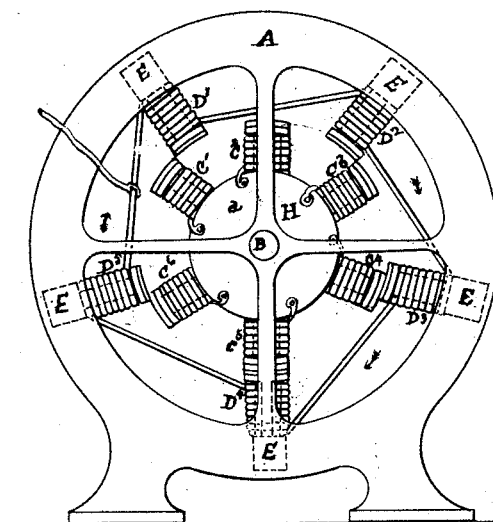
Figure 2:
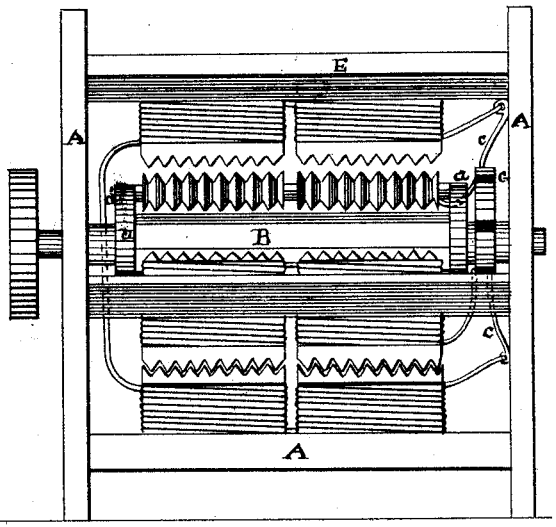
Figure 3:
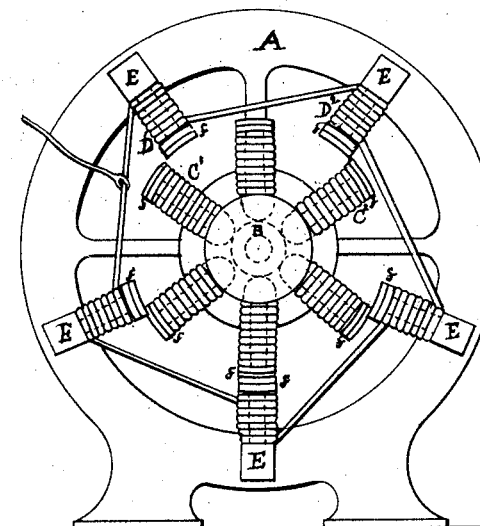
Figure 4:
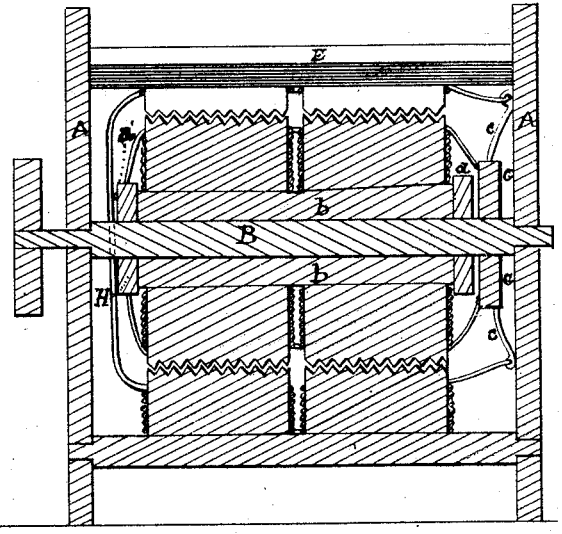

Figure 1 is an end elevation of a machine embodying my invention. Fig. 2 is a side elevation of the same. Fig. 3 is an end view of the same, a portion of the frame being removed to expose to view more completely the interior mechanism. Fig. 4 is a section of the same through the dotted line $x\ x$ of Fig. 3.

My invention relates to a novel construction and arrangement of the magnets in an electro-motor, whereby any given magnetic force in the magnet is rendered available for motive power to a much greater extent than by any form and arrangement of magnets hitherto employed to my knowledge; and consists in serrating or grooving the polar faces of the magnets, as shown in the drawings, and arranging them so that the prominences on the revolving magnets will pass through the depressions or grooves in the stationary magnets.

I find that the increase of motive power thereby gained over plane polar faces is fully equal to the increase of surface effected by the serrating or grooving.

In the drawings, I have represented a series of electro-magnets, $C^1\ C^2\ C^3\ C^4\ C^5\ C^6$, arranged around and secured to a revolving shaft, B. $D^1\ D^2\ D^3\ D^4\ D^5$ are a series of stationary electro-magnets secured in the frame A. arranged around the revolving magnets. The polar faces of both series are correspondingly serrated or channeled, as shown, and those of each series are so placed relatively to the other that the prominences upon the one will traverse the depressions or grooves in the other as the revolving series are rotated.

By suitable devices, well known to those skilled in the art of constructing electro-motors, the electric current is caused to pass through the helices of the several magnets in such order that the several revolving magnets and their corresponding stationary magnets around the circle are successively charged with opposite polarities, so as to cause the rotation of the shaft B in the ordinary way.

Now, it is evident that in this form of the polar faces of magnets there is presented a much greater extent of surface than upon plane faces, over the whole of which magnetic force is exerted, and that as a revolving magnet approaches a stationary one mutual attraction will be exerted along the entire line of the edges of the several teeth or prominences; but it is also evident that in order to render available the increase of motive power by this extension of the polar surfaces one magnet must be made to approach the other in the direction shown—that is to say, across the face of the magnet—so that the side faces of the teeth or prominences of the one shall coincide or traverse the spaces between the teeth or prominences of the other, thus bringing their edges into apposition. No advantage of this serrating of the polar surfaces would be obtained if the moving magnet were made to approach the other in the direction of the axis of the core of the magnet.

I am aware that in a patent issued to Solomon Jones, November 21, 1871, there is described a magnet, the polar end of the core of which is made wedge-shaped, having a reciprocating armature, in which there is a notch which fits onto the wedge-shaped core, the movement of the said armature toward the magnet being in the direction of the axis of its core, the wedge entering the notch point foremost.

I disclaim the arrangement shown and described in the said patent, intending to limit my claim to the serrated or grooved magnets, that are so arranged and made to operate in a motor that the moving magnet shall approach the stationary one in the direction and manner I have described; but, as is evident, it is not essential that the moving magnet should rotate upon an axis. It may have a reciprocating motion, if desired, provided its movements toward the stationary magnet are in the direction of the notches or grooves across its polar face, substantially as herein described. As is also evident, the principle of the construction and arrangement of the magnet herein described may be embodied in an electro-motor in which an electro-magnet and an unpolarized armature or a permanent magnet are employed.

What I do claim, and desire to secure by Letters Patent, is—

The combination, in an electro-motor, of an electro-magnet, the polar face of which is grooved or serrated, with a polarized or unpolarized armature, correspondingly grooved or serrated, the one being arranged to approach the other in the direction of their grooves or notches across their polar faces, as and for the purpose specified.

Witness my hand this 14th day of March, 1873.

WINFIELD S. SIMS.

Witnesses:
W. M. EDWARDS,
J. P. FITCH.